US010305917B2

(12) United States Patent
Chen et al.

(10) Patent No.: US 10,305,917 B2
(45) Date of Patent: May 28, 2019

(54) GRAPH-BASED INTRUSION DETECTION USING PROCESS TRACES (71) Applicant: NEC Laboratories America, Inc., Princeton, NJ (US)

(72) Inventors: Zhengzhang Chen, Princeton Junction, NJ (US); LuAn Tang, Pennington, NJ (US); Boxiang Dong, Hoboken, NJ (US); Guofei Jiang, Princeton, NJ (US); Haifeng Chen, Old Bridge, NJ (US)

(73) Assignee: NEC Corporation (JP)

( * ) Notice: Subject to any disclaimer, the term of this patent is extended or adjusted under 35 U.S.C. 154(b) by 254 days.

(21) Appl. No.: 15/213,896

(22) Filed: Jul. 19, 2016

(65) Prior Publication Data
US 2016/0330226 A1 Nov. 10, 2016

Related U.S. Application Data (63) Continuation-in-part of application No. 15/098,861, filed on Apr. 14, 2016.

(60) Provisional application No. 62/360,572, filed on Jul. 11, 2016, provisional application No. 62/196,404, filed on Jul. 24, 2015, provisional application No. 62/148,232, filed on Apr. 16, 2015.

(51) Int. Cl.
*H04L 29/06* (2006.01)
*G06F 21/55* (2013.01)
*H04L 12/24* (2006.01)

(52) U.S. Cl.
CPC .............. *H04L 63/14* (2013.01); *G06F 21/55* (2013.01); *H04L 29/06877* (2013.01); *H04L 63/1416* (2013.01); *H04L 29/06891* (2013.01); *H04L 29/06911* (2013.01); *H04L 41/12* (2013.01); *H04L 41/142* (2013.01); *H04L 2463/121* (2013.01)

(58) Field of Classification Search
CPC ... H04L 41/12; H04L 63/1416; H04L 41/142; H04L 2463/121; H04L 29/06911; H04L 29/06925; H04L 29/06931; H04L 29/06938; G06F 21/55
USPC .......................................................... 726/23
See application file for complete search history.

(56) References Cited

U.S. PATENT DOCUMENTS 5,278,901 A * 1/1994 Shieh ..................... G06F 21/552
713/188
5,774,695 A * 6/1998 Autrey ..................... H04L 43/00
370/467

(Continued)

OTHER PUBLICATIONS

Darren Mutz et al., Anomalous System Call Detection, ACM Transactions on Information and System Security, vol. 9, No. 1, Feb. 2006, pp. 61-93.

*Primary Examiner* — Shahriar Zarrineh
(74) *Attorney, Agent, or Firm* — Joseph Kolodka (57) ABSTRACT

Methods and systems for detecting malicious processes include modeling system data as a graph comprising vertices that represent system entities and edges that represent events between respective system entities. Each edge has one or more timestamps corresponding respective events between two system entities. A set of valid path patterns that relate to potential attacks is generated. One or more event sequences in the system are determined to be suspicious based on the graph and the valid path patterns using a random walk on the graph.

16 Claims, 6 Drawing Sheets

(56) References Cited

U.S. PATENT DOCUMENTS

| | | | | |
|---|---|---|---|---|
| 5,802,304 | A * | 9/1998 | Stone | H04M 11/06 709/227 |
| 5,889,954 | A * | 3/1999 | Gessel | H04L 41/0816 370/467 |
| 6,832,255 | B1 * | 12/2004 | Rumsewicz | H04L 29/06 709/224 |
| 8,996,622 | B2 * | 3/2015 | Donato | H04L 51/12 709/204 |
| 9,202,052 | B1 * | 12/2015 | Fang | G06F 21/56 |
| 9,210,200 | B1 * | 12/2015 | Chapweske | H04L 65/4038 |
| 9,817,931 | B1 * | 11/2017 | Gu | G06F 17/505 |
| 2007/0097976 | A1 * | 5/2007 | Wood | H04L 63/1416 370/392 |
| 2007/0209074 | A1 * | 9/2007 | Coffman | G06F 21/552 726/23 |
| 2007/0226796 | A1 * | 9/2007 | Gilbert | G06F 21/55 726/22 |
| 2007/0277179 | A1 * | 11/2007 | Suzuka | G06F 9/544 719/313 |
| 2008/0101234 | A1 * | 5/2008 | Nakil | H04L 63/1425 370/235 |
| 2009/0030916 | A1 * | 1/2009 | Andersen | G06F 17/30864 |
| 2009/0300769 | A1 * | 12/2009 | Srinivasa | H04L 63/1416 726/26 |
| 2010/0312669 | A1 * | 12/2010 | Hanus | G06F 17/3053 705/26.64 |
| 2011/0185422 | A1 * | 7/2011 | Khayam | H04L 63/1425 726/23 |
| 2012/0278261 | A1 * | 11/2012 | Lin | G06N 5/003 706/12 |
| 2013/0151543 | A1 * | 6/2013 | Fan | G06F 17/30598 707/758 |
| 2013/0326625 | A1 * | 12/2013 | Anderson | G06F 21/56 726/23 |
| 2014/0046959 | A1 * | 2/2014 | Moreels | G06F 17/30958 707/748 |
| 2015/0032767 | A1 * | 1/2015 | Gao | G06F 17/30864 707/765 |
| 2015/0096026 | A1 * | 4/2015 | Kolacinski | G06F 21/55 726/23 |
| 2015/0161394 | A1 * | 6/2015 | Ferragut | G06F 21/577 726/25 |
| 2016/0070817 | A1 * | 3/2016 | Aggarwal | G06F 17/30516 707/798 |
| 2016/0110365 | A1 * | 4/2016 | Zhu | G06F 17/30958 707/725 |
| 2017/0163668 | A1 * | 6/2017 | Neil | H04L 63/1416 |

* cited by examiner

Require: $G = (V, E, T)$, where $V = F \cup P \cup U \cup I$, $k$,
Ensure: $SP$ that contains the top-k suspicious paths of $G$.
  Initialize $SP$ as an empty priority queue;
  Apply random walk on $G$ to calculate sender score vector $x$ and receiver score vector $y$;
  Let $F_X$ be the files sorted in descendant order of the sender score. Let $F_Y$ be the files sorted in descendant order of the receiver score.
  Create $P_X$, $P_Y$, $U_X$, $U_Y$, $S_X$ and $S_Y$ in the same way.
  Let $E'$ be the edges sorted descendingly by $A[i][j]$
  while $P_X$, $P_Y$, $U_X$, $U_Y$, $S_X$, $S_Y$ and $E'$ are not empty do
    $f_x = F_X.pop()$, $f_y = F_Y.pop()$
    $p_x = P_X.pop()$, $p_y = P_Y.pop()$
    $u_x = U_X.pop()$, $u_y = U_Y.pop()$
    $s_x = S_X.pop()$, $s_y = S_Y.pop()$, $e = E'.pop()$
    Assume $p$ is the path involving $f_x$, $f_y$, $p_x$, $p_y$, $u_x$, $u_y$, $s_x$, $s_y$, $e'$.
    if $Score(p) \leq min\{Score(p')|p' \in SP\}$ then
      break
    else
      Find the path set $\mathcal{P}$ such that every path $p$ confirms to the event sequence pattern and time constraint, and $p$ involves at least one node in $\{f_x, f_y, p_x, p_y, u_x, u_y, s_x, s_y\}$ or $e'$.
      for all $p \in \mathcal{P}$ do
        if $Score(p) > min\{Score(p')|p' \in SP\}$ then
          Insert $p$ into $SP$
          if $SP$ contains $k+1$ paths then
            Remove the (k+1)-th path from $SP$.
          end if
        end if
      end for
    end if
  end while
  return $SP$

GRAPH-BASED INTRUSION DETECTION USING PROCESS TRACES

RELATED APPLICATION INFORMATION

This application is a continuation in part of application Ser. No. 15/098,861, filed on Apr. 14, 2016, which in turn claims priority to Application Ser. No. 62/148,232, filed on Apr. 16, 2015. This application further claims priority to Application Ser. No. 62/196,404, filed on Jul. 24, 2015, and to Application Ser. No. 62/360,572, filed on Jul. 11, 2016, incorporated herein by reference in their entirety.

BACKGROUND

Technical Field

The present invention relates to computer and information security and, more particularly, to host-level intrusion detection on massive process traces.

Description of the Related Art

Enterprise networks are key systems in corporations and they carry the vast majority of mission-critical information. As a result of their importance, these networks are often the targets of attack. To guarantee the information security in the network of computers, an intrusion detection system is needed to keep track of the running status of the entire network and identify scenarios that are associated with potential attacks or malicious behaviors.

At the host level, detection systems collect rich information about process/program events (e.g., when a program opens a file) on a particular host or machine. While this information enables intrusion detection systems to monitor intrusive behavior accurately, signature-based detection techniques fail to detect new threats, while anomaly-based detection techniques either focus on detecting a single abnormal process or need an offline model to be built from training data with purely normal events.

More importantly, intrusion detection systems often rely on a coordinated or sequential, not independent, action of several system events to determine what state a given system is in. The system monitoring data is typically made up of low-level process events or interactions between various system entities, such as processes, files and sockets (e.g., when a program opens a file or connects to a server) with exact time stamps, while attempted intrusions are higher-level activities which usually involve multiple different process events. For example, a network attack called Advanced Persistent Threat (APT) is composed of a set of stealthy and continuous computer hacking processes. APT first attempts to gain a foothold in the environment. Then, using the compromised systems as an access into the target network, APT deploys additional tools that help fulfill the attack objective. The gap existing between the levels of process events and intrusion activities makes it hard to infer which process events are related to real malicious activities, especially considering that there are massive, "noisy" process events happening in between. Hence, conventional attack detection techniques that identify individual suspicious process events are inadequate to address this scenario.

SUMMARY

A method for detecting malicious processes includes modeling system data as a graph comprising vertices that represent system entities and edges that represent events between respective system entities. Each edge has one or more timestamps corresponding respective events between two system entities. A set of valid path patterns that relate to potential attacks is generated. One or more event sequences in the system are determined to be suspicious based on the graph and the valid path patterns using a random walk on the graph.

A system for detecting malicious processes includes a modeling module configured to model system data as a graph that has vertices that represent system entities and edges that represent events between respective system entities. Each edge includes one or more timestamps corresponding respective events between two system entities. A malicious process path discovery module includes a processor configured to generate a set of valid path patterns that relate to potential attacks and to determine one or more event sequences in the system to be suspicious based on the graph and the valid path patterns using a random walk on the graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, the present embodiments provide malicious process path discovery, detecting abnormal process paths that are related to intrusion activities. This is accomplished using process traces. A set of valid sequence patterns is generated and a random walk based process is used to learn system functions and discover suspicious process sequences. To eliminate score bias from the path length, the Box-Cox power transformation is applied to normalize the anomaly scores of process sequences.

The present embodiments thereby provide complete evidence of an attacker's activity trace (i.e., the process path) after an attack has occurred. In addition, the present embodiments more accurately detect malicious process paths, reducing the number of false positives and false negatives in less time and with less computational complexity. A compact graph structure may be used to reduce memory load, a set of valid sequence patterns may be generated and used to reduce the search space, and a random walk approach may be used to reduce the computational cost. Furthermore, the present embodiments are able to detect new attacks because no training data is needed.

Figure 1:
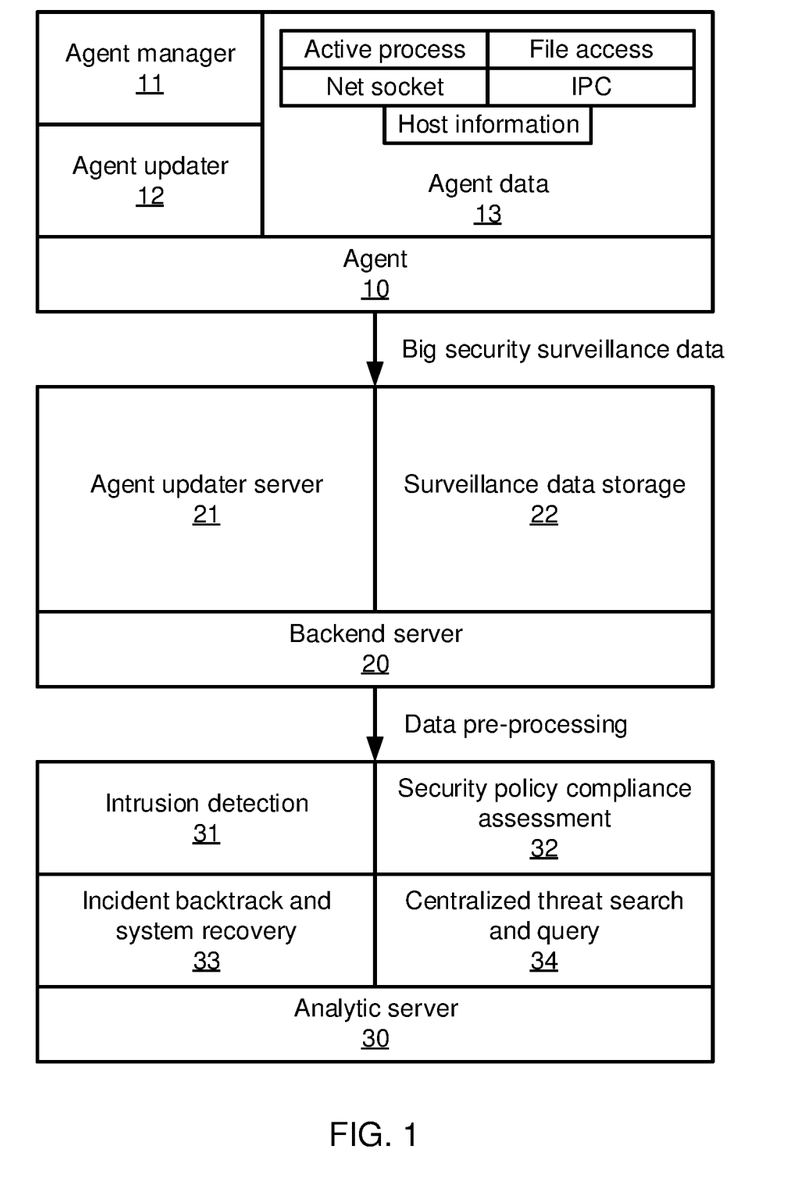
FIG. 1 is directed to a network graph representing communities and roles of nodes in accordance with the present principles.

Referring now in detail to the figures in which like numerals represent the same or similar elements and initially to FIG. 1, an automatic security intelligence system (ASI) architecture is shown. The ASI system includes three major components: an agent 10 is installed in each machine of an enterprise network to collect operational data; backend servers 200 receive data from the agents 10, pre-process the data, and sends the pre-processed data to an analysis server 30; and an analysis server 30 that runs the security application program to analyze the data.

Each agent 10 includes an agent manager 11, an agent updater 12, and agent data 13, which in turn may include information regarding active processes, file access, net sockets, number of instructions per cycle, and host information. The backend server 20 includes an agent updater server 21 and surveillance data storage. Analysis server 30 includes intrusion detection 31, security policy compliance assessment 32, incident backtrack and system recovery 33, and centralized threat search and query 34.

Figure 2:
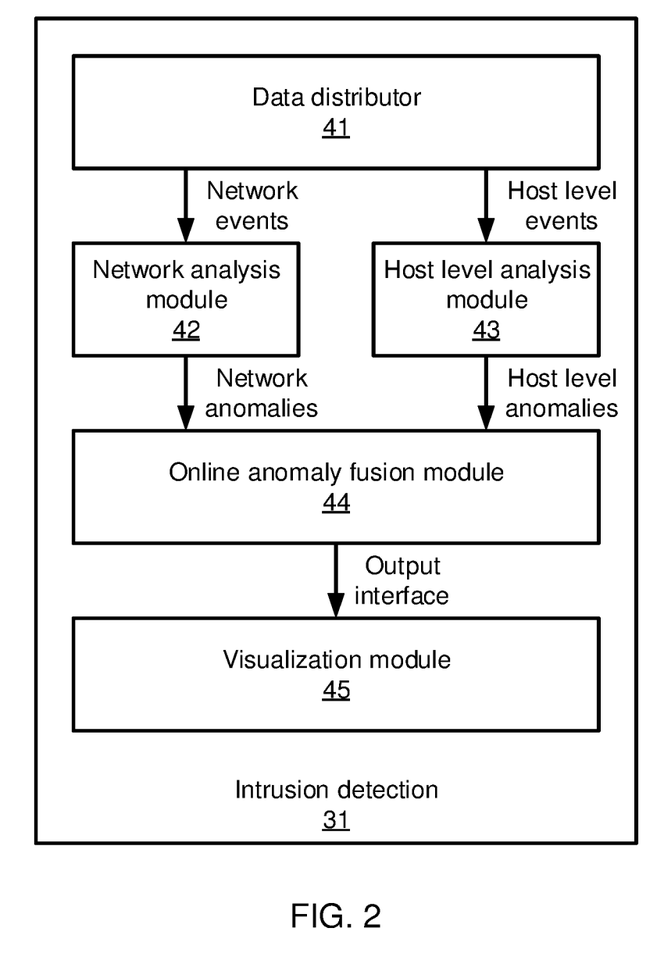
FIG. 2 is a block/flow diagram of a method of discovering community and role memberships and detecting anomalies in accordance with the present principles.

Referring now to FIG. 2, additional detail on intrusion detection 31 is shown. There are five modules in an intrusion detection engine: a data distributor 41 that receives the data from backend server 20 and distributes the corresponding to network level module 42 and host level module 43; network analysis module 42 that processes the network communications (including TCP and UDP) and detects abnormal communication events; host level analysis module 43 that processes host level events, including user-to-process events, process-to-file events, and user-to-registry events; anomaly fusion module 44 that integrates network level anomalies and host level anomalies and refines the results for trustworthy intrusion events; and visualization module 45 that outputs the detection results to end users.

Figure 3:
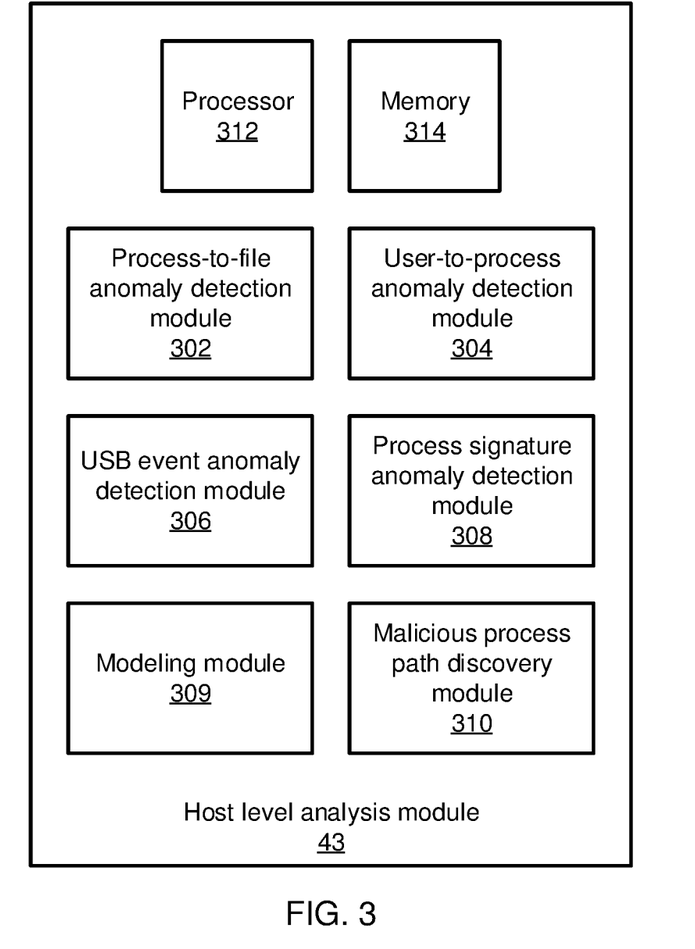
FIG. 3 is a block diagram of a host-level analysis module in accordance with the present principles.

Referring now to FIG. 3, additional detail on the host level analysis module 43 is shown. The host level analysis module 43 includes a hardware processor 312 and a memory 314. In addition, the host level analysis module 43 includes one or more functional modules that may, in one embodiment, be stored in memory 314 and executed by hardware processor 312. In alternative embodiment, the functional modules may be implemented as one or more discrete hardware components in the form of, e.g., application specific integrated chips or field programmable gate arrays.

The host level analysis module 43 includes a number of different analysis and detection functions. A process-to-file anomaly detection module 302 takes host level process-to-file events from data distributor 41 as input and discovers abnormal process-to-file events. These events may include, e.g., reading from or writing to a file. A user-to-process anomaly detection module 304 takes all streaming process events as input from the data distributor 41 and models each user's behavior at the process level, identifying suspicious processes run by each user. A USB event anomaly detection module 306 also considers the streaming process events and identifies all USB device-related events to detect anomalous device activity. A process signature anomaly detection module 308 takes process names and signatures as input from data distributor 41 and detects processes with suspicious signatures. Finally, a malicious process path discovery module 310 takes current active processes from the data distributor 41 as starting points and tracks all of the possible process paths by combing the incoming and previous events in a time window. The malicious process path discovery module 310 detects anomalous process sequences/paths as described in greater detail below.

Figure 4:
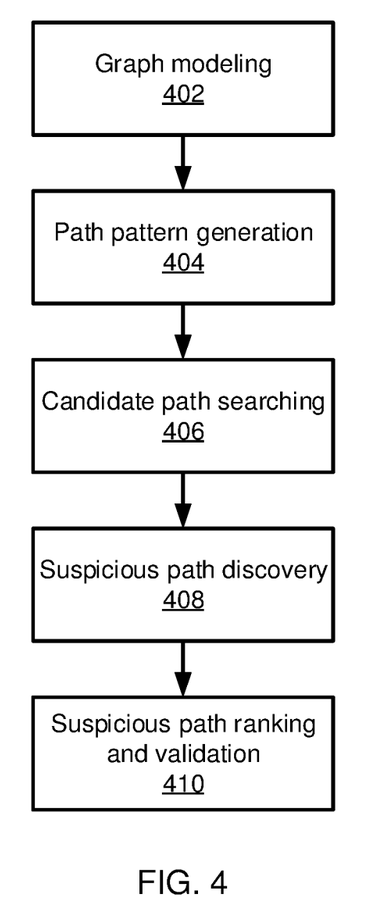
FIG. 4 is a block/flow diagram of a method for detecting suspicious host-level event sequences in accordance with the present principles.

Referring now to FIG. 4, a method for malicious process path detection is shown. A blueprint graph is used as input. The blueprint graph is a heterogeneous graph constructed from a historical dataset of communications in a network, with nodes of the blueprint graph representing physical devices on an enterprise network and edges reflecting the normal communication patterns among the nodes. Block 402 performs graph modeling, using a compact graph structure to capture the complex interactions between system entities as an acyclic, multipartite graph. Block 404 then generates a set of valid sequence patterns based on a maximum sequence length. The maximum sequence length may be set by a user or an optimal value may be determined automatically. Forming the valid sequence patterns dramatically reduces the search space size of the graph.

Block 406 then scans the graph to determine candidate event sequences that is consistent with the patterns. A "pattern" refers to an ordered set of system entity types, while a "sequence" refers to an ordered set of specific system entities. Thus, a sequence is consistent with a pattern if its series of system entities' respective types match those of the pattern. Sequences are alternatively referred to herein as "paths."

Block 408 applies a random walk to extract the characteristics of every entity. Based on a discovered entity's nature, block 408 calculates an anomaly score of each candidate process to evaluate how abnormal the process is. As there may be multiple different sequence patterns of different lengths, and as the scores of two paths with different lengths are not directly comparable, the anomaly score distribution for each sequence pattern is transformed into a single distribution by block 410 using, e.g., a Box-Cox power transformation. Block 410 measures the deviation between the suspicious sequences and the normal sequences, reporting those sequences that have a higher-than-threshold deviation.

Attacking behavior often involves multiple system entities (e.g., processes, files, sockets, etc.). Therefore the present embodiments incorporate the interactions between multiple different system entities.

The amount of information provided by system monitoring can be extremely large, making direct storage and access of that information in memory impractical. However, the information has a large degree of redundancy. Redundancy can be found first in attributes, as each event record includes not only the involved entities but also the attributes of these entities. Storing the attributes repeatedly for each event is redundant. Second, saving events that involve the same entities repeatedly with only time stamps changing between them is redundant. Third, storage of records that are irrelevant to the detection of intrusion attacks is unneeded.

The graph model is therefore generated by block 402 to incorporate the meaningful information from the monitoring data in a compressed way. The graph model is represented as a directed graph G=(V, E, T), where T is a set of timestamps, $E \subset V \times V \times T$ is the set of edges, and $V = F \cup P \cup U \cup S$ is the set of vertices, where F is the set of files residing in the computer system, P is the set of processes, U is the set of UNIX® sockets, and S is the set of Internet sockets. For a specific edge $(v_i, v_j)$ in E, $T(v_i, v_j)$ denotes the set of timestamps on the edge. For each event e, if the corresponding edge already exists in G, a timestamp t is added to the edge timestamps. If not, block 402 builds such an edge to G with the timestamp set $T(v_i, v_j) = \{t\}$. In this structure, the attribute values for a unique entity are stored only once. For each event sequence of a length l, there is a corresponding path through G of l edges.

To extract the most suspicious paths from the graph G, a naïve approach would be to explore all of the existing paths. However, it is impractical to enumerate all the possible paths from a densely connected graph. To provide guidance to candidate searching in block 406, block 404 generates a set of valid path patterns B. Only those paths that conform to the valid path patterns are related to potential attacks—others may be discarded.

Each path pattern B of length l includes l entities and/or entity types. Thus the path pattern B may include both specific entities (e.g., particular files) as well as more general designations of entity type in the same path. B is determined to be a valid path pattern only if there exists at least a path p in G that is consistent with B. Considering that l may be a small number, all of the possible paths can be enumerated. Searching the graph G permits all of the valid patterns to be extracted.

The valid path patterns B may be, for example, generated by experts using their experiences with previous intrusion detection attacks. However, it may be difficult to obtain an accurate and complete set of valid path patterns from such experts. As such, path patterns may be automatically generated. Each entity is set as a specific system entity type. For all the paths that correspond to information leakage, they must begin with a File entity (F) and end with an Internet socket entity (I). Given a path p∈G and a path pattern B of G, p[i] and B[i] represent the $i^{th}$ node in p and B respectively. The path p is therefore consistent with B, denoted as p≺B, if p and B have the same length and if, for each I, p[i]∈B[i] (i.e., the specific entity p[i] belongs to the entity type B[i]). Then B is a valid path pattern if there exists at least one path p in G such that p≺B. In one example following the above constraints, there are four potential path patterns of length three using the four entity types described above: {F, F, I}, {F, P, I}, {F, U, I}, and {F, I, I}. Because only a Process node can connect a File node to an Internet socket node. In this manner, all of the valid patterns in G can be discovered.

Based on the generated valid path patterns B, block 406 searches for paths in the multipartite graph satisfying the patterns. Given an event sequence seq={$e_1, e_2, \ldots, e_r$}, there must be an equivalent path p={$v_1, v_2, \ldots, v_{r+1}$} in the graph G. Because the events follow time order, a time order constraint is applied to candidate path searching. By applying the path patterns and the time order constraint to a breadth first search, the candidate paths can be discovered with a one-time scan of G. The candidate paths C are defined as:

$$C=\{p|p \in G, \exists b \in B s.t. p \prec b\}$$

Even with a filtering policy based on path patterns and the time order constraint, there can still be a large number of candidate paths remaining in the graph G, most of which will be related to normal behavior. As such, the present embodiments extract suspicious paths from the larger set of candidate paths.

A candidate path is determined to be suspicious by block 408 if, in the path, the involved entities behave differently from their normal roles. In a computer system, the information senders and receivers are identified as entity roles. The sender and receiver score should be accurately learned from the computer system, as they are used to set the profile of normal behavior. To achieve this, a random walk is applied to the graph G. From G, an N×N square transition matrix A is calculated as:

$$A[i][j] = prob(v_i \to v_j) = \frac{|T(v_i, v_j)|}{|\sum_{k=1}^{N} |T(v_i, v_j)||}$$

where N is the total number of entities and $T(v_i, v_j)$ is the set of timestamps on which the event between $v_i$ and $v_j$ has ever happened. Thus A[i][j] denotes the probability that the information flows from $v_i$ to $v_j$ in G.

As A is the matrix representation of the multipartite graph G, A can also be denoted as:

$$A = \begin{array}{c|cccc} & P & F & S & U \\ \hline P & 0 & A^{P \to F} & A^{P \to S} & A^{P \to U} \\ F & A^{F \to P} & 0 & 0 & 0 \\ S & A^{S \to P} & 0 & 0 & 0 \\ U & A^{U \to P} & 0 & 0 & A^{U \to U} \end{array}$$

where zero represents a zero sub-matrix, and where the arrow operator indicates a direction of information flow. For example, P→F indicates a flow of information from process to file. It should be noted that the non-zero sub-matrices of A only appear between processes and files and between processes and sockets, but not between respective processes, because process-process interactions do not come with interaction flow. These are constraints set by UNIX® systems.

Letting X be a sender score vector, with X[i] denoting $v_i$'s sender score, and letting Y be the receiver score vector, then each entity's sender and receiver scores can be iteratively generated as:

$$\begin{cases} X_{m+1}^T = (A \times A^T) \times X_{m-1}^T \\ Y_{m+1}^T = (A^T \times A) \times Y_{m-1}^T \end{cases}$$

with initial vectors $X_0$ and $Y_0$ being randomly generated and with m referring to the number of the current iteration. Stated generally, an entity that sends information to a large number of entities having high receiver scores is itself an important information sender, and similarly an entity that receives information from a large number of entities having high sender scores is an important information receiver. The sender and receiver scores for an entity are therefore iteratively calculated by accumulating the receiver and sender scores related to the entity. For example, the file/etc/passwd on a UNIX® system will have a high sender score and a low receiver score, because it is sent to many processes for checking access permissions, but it is rarely modified.

A result of this iterative refinement is that the learned score values will depend on the initial score values. However, the effect of the initial score values can be eliminated using the steady state property of the matrix. Given a general square matrix M and a general vector π, the general vector π can be repeatedly updated as:

$$\pi_{m+1}^T = M \times \pi_m^T$$

A convergence state is possible such that $\pi_{m+1} \approx \pi_m$ for sufficiently large values of m. In this case, there is only one unique value which can reach the convergence state:

$$\pi_n^T = M \times \pi_n^T$$

The convergence state has the property that the converged vector is only dependent on the matrix M, but is independent from the initial vector value $\pi_0$.

To reach the convergence state, the matrix M needs to satisfy two conditions: irreducibility and aperiodicity. A graph G is irreducible if and only if, for any two nodes, there exists at least one path between them. The period of a node is the minimum path length from the node back to itself, and the period of a graph is the greatest common divisor of all of the nodes' period values. A graph G is aperiodic if and only if it is irreducible and the period of G is 1.

As the system graph G is not always strongly connected, the above-described iteration will not always reach convergence. To ensure convergence, a restart matrix R is added, which is an N×N square matrix, with each cell value being 1/N. A new transition matrix $\overline{A}$ is defined as:

$$\overline{A}=(1-c)\times A+c\times R$$

where c is a value between 0 and 1 and is referred to as the restart ratio. $\overline{A}$ is guaranteed to be irreducible and aperiodic, providing converged sender score and receiver score vectors. The convergence rate can be controlled by controlling the restart rate value. One exemplary value for a number of iterations to use to ensure convergence is about 10.

Based on the sender and receiver score, and given a path p, the anomaly score for the path is calculated as:

$$Score(p) = 1 - NS(p)$$

$$NS(p) = 1 - \prod_{i=1}^{r} X(v_i)A(v_i, v_{i+1})Y(v_{i+1})$$

As noted above, the anomaly scores for paths of different lengths have different distributions. Therefore, to compare the suspiciousness of paths of different lengths, a transformation is performed to put paths of different length on equal footing. The path anomaly score can have an arbitrary distribution and is generally not a normal distribution. The suspiciousness of a path of length r can be defined as:

$$susp(p|r)=Prob(T(Score(p'))\leq T(Score(p))||p'|=r)$$

where T is the normalization function.

The top k suspicious paths are those having the largest suspiciousness score. Mathematically, it is feasible to get the transformation to convert a normal distribution to any other distribution, but it is difficult to get the inverse function. To solve this problem, a Box-Cox power transformation is used as the normalization function. In particular, letting Q(r) denote the set of anomaly scores calculated from paths of length r, for each score q∈Q(r).

$$T(q, \lambda) = \begin{cases} \frac{q^\lambda - 1}{\lambda} : \lambda \neq 0 \\ \log(q) : \lambda = 0 \end{cases}$$

where λ is a normalization parameter. Different values for λ yield different transformed distributions. The aim is to select a value of λ that yields a normalized distribution as close as possible to the normal distribution (i.e., $T(B,\lambda)\sim N(\mu,\sigma^2)$).

The top k suspicious paths are not considered related to intrusion attacks unless they are sufficiently distinctive from the normal paths. To measure the deviation from suspicious paths from normal paths, the t-value is calculated between the two groups of paths. Due to the large number of normal paths, an efficient solution based on a Monte Carlo simulation is used to calculate the expectation and variance from a sample of relatively small size without computing the summation.

Once a suspicious path has been detected, the host-level analysis module 43 provides information regarding the anomaly, generating a report that may include one or more alerts. The anomaly fusion module 44 integrates these host-level alerts with other host- and network-level anomalies and automatically filters out false alarms. The resulting list of anomalies is provided via visualization module 45 to a user. In an alternative embodiment, certain anomalies or classes of anomalies may be addressed automatically, for example by deploying security countermeasures or mitigations. In one specific example, an automatic response to a detected anomaly may be to shut down a device showing the anomalous behavior until it can be reviewed by an administrator.

Figure 5:
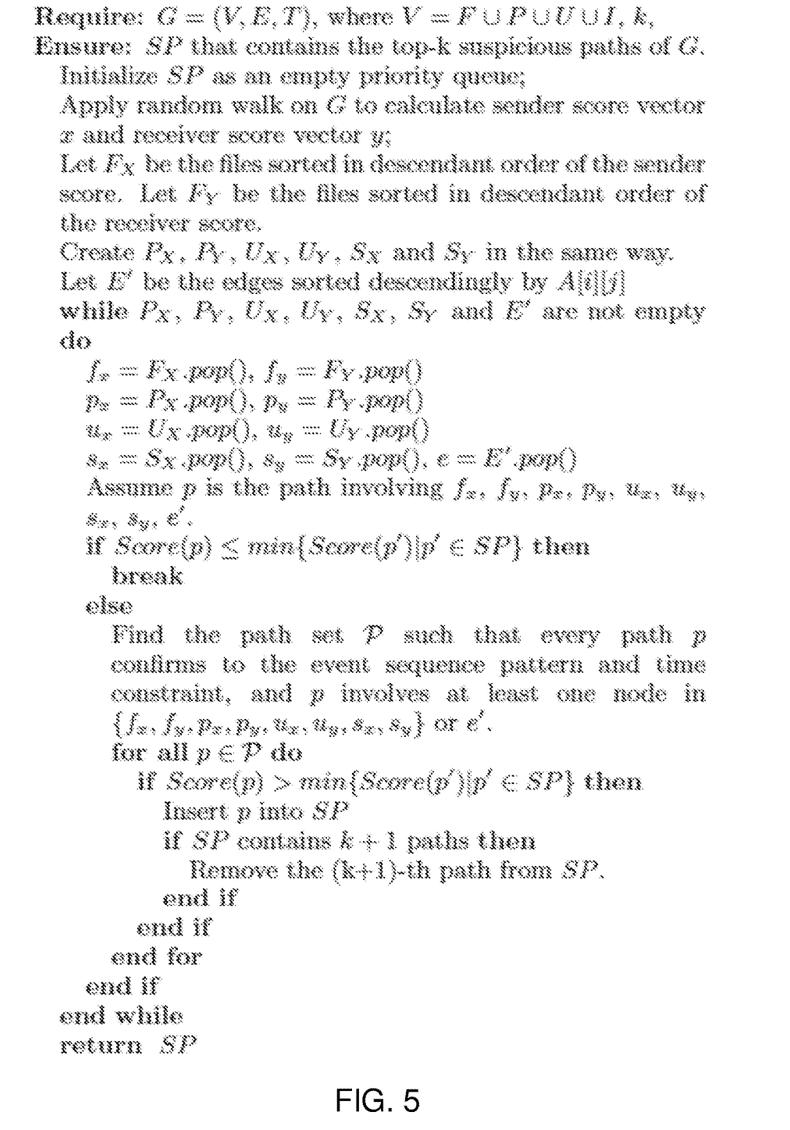
FIG. 5 is a segment of pseudo-code for detecting suspicious host-level event sequences in accordance with the present principles.

Referring now to FIG. 5, pseudo-code for discovering the top k suspicious paths "SP." Sender and receiver score vectors X and Y are created using the random walk process. A queue of files $F_X$ is sorted according to descending X and a second queue of files $F_Y$ is sorted descending Y. Queues of processes $P_X$ and $P_Y$, queues of UNIX® sockets $U_X$ and $U_Y$, and queues of internet sockets $S_X$ and $S_Y$ are created in the same way. The paths are then processed to find a path set that conforms to the event sequence pattern and time constraint.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
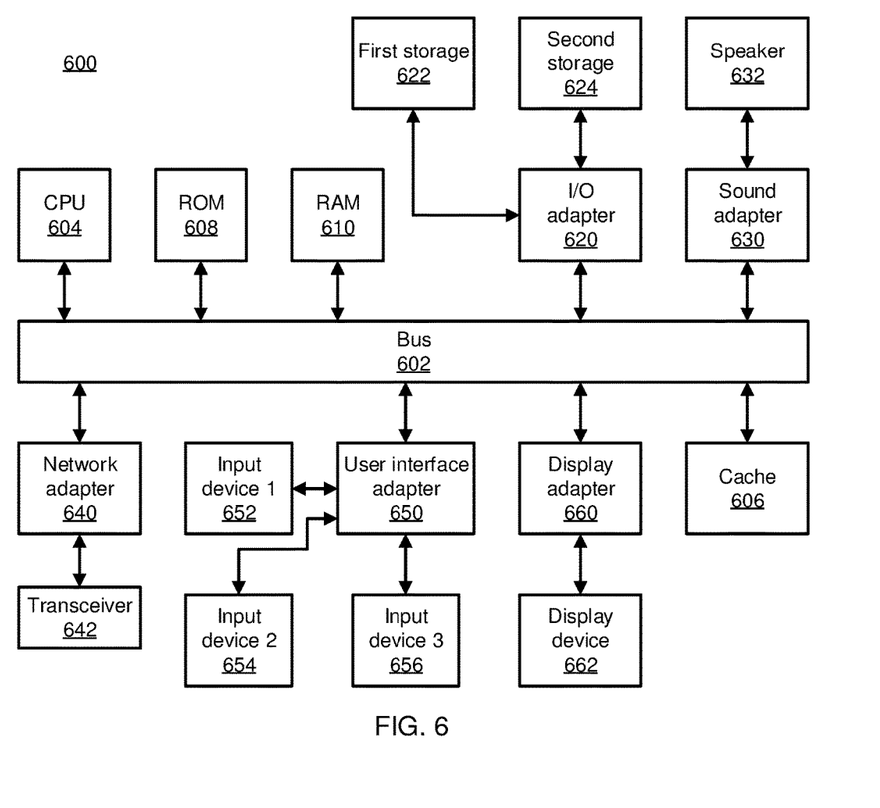
FIG. 6 is a block diagram of a processing system in accordance with the present principles.

Referring now to FIG. 6, an exemplary processing system 600 is shown which may represent the analytic server 30, the intrusion detection system 31, and/or the host level analysis module 43. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting malicious processes, comprising:

modeling system data as a graph comprising vertices that represent system entities and edges that represent events between respective system entities, each edge comprising one or more timestamps corresponding respective events between two system entities;

generating a set of valid path patterns that relate to potential attacks; and determining one or more event sequences in the system to be suspicious, using a hardware processor, based on the graph and the valid path patterns using a random walk on the graph by determining a sender score for a sender entity and a receiver score for a receiver entity to determine that the entities on an edge deviate from normal roles for those entities, with an anomaly score for each event sequence p being determined as:

$$\text{Score}(p) = 1 - \prod_{i=1}^{r} X(v_i) A(v_i, v_{i+1}) Y(v_{i+1})$$

where $X(v_i)$ is the sender score for vertex $v_i$, $A(v_i, v_{i+1})$ is a probability that information flows from vertex $v_i$ to vertex $v_{i+1}$, and $Y(v_{i+1})$ is the receiver score for vertex $v_{i+1}$, and r is a length of the sequence p.

2. The method of claim 1, wherein the system entities comprise files in the system, processes in the system, UNIX® sockets in the system, and Internet sockets in the system.

3. The method of claim 1, wherein the valid patterns are determined based on properties of the system entity types.

4. The method of claim 3, wherein the valid path patterns are determined based on definitions provided by security experts according to their experiences based on previous intrusion attacks.

5. The method of claim 1, wherein determining the one or more event sequences to be suspicious comprises performing a breadth first search of candidate paths within the graph.

6. The method of claim 5, wherein the breadth first search comprises a time order constraint based on the edge timestamps.

7. The method of claim 1, wherein determining one or more event sequences to be suspicious comprises calculating an anomaly score based on the sender score and receiver score for each entity in each event sequence.

8. The method of claim 7, wherein determining one or more event sequences to be suspicious comprises normalizing anomaly scores using a Box-Cox power transformation.

9. A system for detecting malicious processes, comprising:

a modeling module configured to model system data as a graph that comprises vertices that represent system entities and edges that represent events between respective system entities, each edge comprising one or more timestamps corresponding respective events between two system entities; and a malicious process path discovery module comprising a processor configured to generate a set of valid path patterns that relate to potential attacks and to determine one or more event sequences in the system to be suspicious based on the graph and the valid path patterns using a random walk on the graph by determining a sender score for a sender entity and a receiver score for a receiver entity to determine that the entities on an edge deviate from normal roles for those entities, with an anomaly score for each event sequence p being determined as:

$$\text{Score}(p) = 1 - \prod_{i=1}^{r} X(v_i)A(v_i, v_{i+1})Y(v_{i+1})$$

where $X(v_i)$ is the sender score for vertex $v_i$, $A(v_i, v_{i+1})$ is a probability that information flows from vertex $v_i$ to vertex $v_{i+1}$, and $Y(v_{i+1})$ is the receiver score for vertex $v_{i+1}$, and r is a length of the sequence p.

10. The system of claim 9, wherein the system entities comprise files in the system, processes in the system, UNIX® sockets in the system, and Internet sockets in the system.

11. The system of claim 9, wherein the malicious process path discovery module is further configured to determine valid patterns based on properties of the system entity types.

12. The system of claim 11, wherein the malicious process path discovery module is further configured to determine valid path patterns based on definitions provided by security experts according to their experiences based on previous intrusion attacks.

13. The system of claim 9, wherein the malicious process path discovery module is further configured to perform a breadth first search of candidate paths within the graph.

14. The system of claim 13, wherein the breadth first search comprises a time order constraint based on the edge timestamps.

15. The system of claim 9, wherein the malicious process path discovery module is further configured to calculate an anomaly score based on the sender score and receiver score for each entity in each event sequence.

16. The system of claim 15, wherein the malicious process path discovery module is further configured to normalize anomaly scores using a Box-Cox power transformation.

\* \* \* \* \*